US012731739B2

(12) United States Patent
Singh et al.

(10) Patent No.: US 12,731,739 B2
(45) Date of Patent: Sep. 8, 2026

(54) SWITCH WITH A MOVABLE CONTACT AND AN ELASTIC ASSEMBLY

(71) Applicant: Eaton Intelligent Power Limited, Dublin (IE)

(72) Inventors: Upendra Singh, Raipur (IN); Harsh Kumar, Muzaffarnagar (IN); Shrikant Hanumantrao Tarte, Beed (IN)

(73) Assignee: Eaton Intelligent Power Limited, Dublin (IE)

( * ) Notice: Subject to any disclaimer, the term of this patent is extended or adjusted under 35 U.S.C. 154(b) by 125 days.

(21) Appl. No.: 18/200,622

(22) Filed: May 23, 2023

(65) Prior Publication Data

US 2023/0420194 A1 Dec. 28, 2023

Related U.S. Application Data

(60) Provisional application No. 63/355,173, filed on Jun. 24, 2022.

(51) Int. Cl.

*H01H 3/38* (2006.01)
*H01H 1/20* (2006.01)
*H01H 3/42* (2006.01)

(52) U.S. Cl.

CPC ................ *H01H 3/38* (2013.01); *H01H 3/42* (2013.01); *H01H 1/20* (2013.01); *H01H 2221/046* (2013.01)

(58) Field of Classification Search

CPC .. H01H 3/38; H01H 3/42; H01H 1/20; H01H 2221/046; H01H 33/40; H01H 5/10;

(Continued)

(56) References Cited

U.S. PATENT DOCUMENTS 3,063,003 A 11/1962 Pirhofer
4,307,358 A 12/1981 Haury et al.

(Continued)

FOREIGN PATENT DOCUMENTS

CN 108172457 A 6/2018
DE 1890265 U 4/1964

(Continued)

OTHER PUBLICATIONS

Cooper Power Series: Electrically operated Type NR oil switch, Catalog No. CA230007EN, Eaton Corporation, Aug. 2015.

(Continued)

*Primary Examiner* — William A Bolton

(74) *Attorney, Agent, or Firm* — DiBerardino McGovern IP Group LLC

(57) ABSTRACT

An electrical apparatus includes: a first electrically conductive contact; and a switch. The switch includes: an electrically conductive moveable contact; a cam; an actuator connected to the electrically conductive moveable contact, the actuator including a cam region configured to interact with the cam. Rotation of the cam moves the actuator between one of two stable positions, the two stable positions including a first position and a second position. The switch also includes an elastic assembly coupled to the actuator, the elastic assembly configured to hold the actuator in either of the two stable positions. When the actuator is in the first position, the switch is closed and the electrically conductive moveable contact is connected to the first electrically conductive contact; and, when the actuator is in the second position, the switch is open and the electrically conductive moveable contact is separated from the first electrically conductive contact.

21 Claims, 6 Drawing Sheets

(58) Field of Classification Search

CPC ...... H01H 13/285; H01H 13/22; H01H 13/26; H01H 13/28; H01H 13/30; H01H 13/32; H01H 13/34; H01H 13/562

USPC ....... 200/502, 511, 512, 524, 533, 535, 542, 200/545, 551, 558, 568; 335/6

See application file for complete search history.

(56) References Cited

U.S. PATENT DOCUMENTS

| | | | | |
|---|---|---|---|---|
| 5,532,444 A | 7/1996 | Bonrath et al. | | |
| 6,583,978 B2 | 6/2003 | Rostron et al. | | |
| 7,429,708 B1 * | 9/2008 | Poyner | H01H 27/002 | 200/43.07 |
| 8,963,039 B2 * | 2/2015 | Ohda | H01H 33/565 | 218/78 |
| 9,373,456 B2 * | 6/2016 | Yang | H01H 3/3026 | |
| 9,640,349 B2 * | 5/2017 | Hashimoto | H01H 33/40 | |
| 2015/0008104 A1 * | 1/2015 | Hoepfl | H01H 9/0027 | 200/11 TC |
| 2017/0004943 A1 | 1/2017 | Hoepfl et al. | | |
| 2020/0243286 A1 * | 7/2020 | Leccia | H01H 33/664 | |

FOREIGN PATENT DOCUMENTS

| | | | |
|---|---|---|---|
| DE | 102007005510 | A1 | 8/2007 |
| DE | 102011086172 | A1 | 5/2012 |
| DE | 102014102875 | A1 | 9/2015 |
| EP | 2843676 | A1 | 3/2015 |
| WO | 2005062326 | A1 | 7/2005 |

OTHER PUBLICATIONS

Uwe Ernst, European Patent Office, International Search Report and Written Opinion, counterpart PCT Application No. PCT/EP2023/025284, mailed Sep. 27, 2023, 15 pages total.

* cited by examiner

SWITCH WITH A MOVABLE CONTACT AND AN ELASTIC ASSEMBLY

CROSS-REFERENCE TO RELATED APPLICATION

This application claims the benefit of U.S. Provisional Application No. 63/355,173, filed on Jun. 24, 2022 and titled Switch with a Movable Contact and an Elastic Assembly, which is incorporated herein by reference in its entirety.

TECHNICAL FIELD

This disclosure relates to a switch with a moveable contact and an elastic assembly. The switch is configured for use with an electrical apparatus.

BACKGROUND

Switches are used in an electrical apparatus (for example, an oil capacitor switch) to control a connection between the electrical apparatus and an external electrical device and/or between the electrical apparatus and an alternating current (AC) power grid.

SUMMARY

In one aspect, an electrical apparatus includes: a first electrically conductive contact; and a switch. The switch includes: an electrically conductive moveable contact; a cam; and an actuator connected to the electrically conductive moveable contact, the actuator including a cam region configured to interact with the cam. Rotation of the cam moves the actuator between one of two stable positions, the two stable positions including a first position and a second position. The switch also includes an elastic assembly coupled to the actuator, the elastic assembly configured to hold the actuator in either of the two stable positions. When the actuator is in the first position, the switch is closed and the electrically conductive moveable contact is connected to the first electrically conductive contact; and, when the actuator is in the second position, the switch is open and the electrically conductive moveable contact is separated from the first electrically conductive contact.

Implementations may include one or more of the following features.

The elastic assembly may be in a relaxed state when the actuator is in the first position and in the relaxed state when the actuator is in the second position.

The elastic device may include one or more springs.

The actuator may include a rod that extends from a first end to a second end, the first end of the rod may be connected to the electrically conductive moveable contact, and the cam region may include a slot that extends from the rod. The slot may include a first side and a second side. The cam may include a first lobe and a second lobe. The first lobe may push on the first side of the slot to separate the moveable electrically conductive contact and the first electrically conductive contact; and the second lobe may push on the second side of the slot to connect the moveable electrically conductive contact and the first electrically conductive contact. In some implementations, the cam is oblong, and, in these implementations, a first portion of the cam pushes on the first side of the slot to separate the moveable electrically conductive contact and the first electrically conductive contact; and a second portion of the cam pushes on the second side of the slot to connect the moveable electrically conductive contact and the first electrically conductive contact.

The electrical apparatus also may include a support, the elastic assembly may be connected to the actuator and the support, and the first electrically conductive contact may be mounted to the support. The electrical apparatus also may include a tank that defines an interior region, and the switch and the first electrically conductive contact may be in the interior region. The electrical apparatus also may include an operating interface coupled to the cam, and the operating interface may be accessible from an exterior of the tank such that interacting with the operating interface causes the cam to rotate. The electrical apparatus may include an insulating fluid, and the first electrically conductive contact may be a stationary contact that is electrically connected to a capacitive device in the interior region.

The elastic assembly may have an expanded state and a compressed state, and the elastic assembly may be in the expanded state when the actuator is in the first position and when the actuator is in the second position.

The elastic assembly may have an expanded state and a compressed state, and the elastic assembly may be in the compressed state when the actuator is at a midpoint between the first position and the second position. The elastic assembly may be in the expanded state when the actuator is in the first position and when the actuator is in the second position.

In another aspect, a switch includes: an electrically conductive moveable contact; a cam; an actuator connected to the electrically conductive moveable contact, the actuator including a cam region configured to interact with the cam, where the actuator is associated with a first stable position and a second stable position; and an elastic assembly coupled to the actuator, the elastic assembly configured to hold the actuator in either the first stable position or the second stable position. When the actuator is in the first stable position, the switch is closed and the electrically conductive moveable contact is connected to a first electrically conductive contact; and, when the actuator is in the second stable position, the switch is open and the electrically conductive moveable contact is separated from the first electrically conductive contact.

Implementations may include one or more of the following features.

The elastic assembly may be in a relaxed state when the actuator is in the first stable position and in the relaxed state when the actuator is in the second stable position.

The elastic device may include one or more springs.

In another aspect, a switch for an electrical apparatus includes: an electrically conductive moveable contact; an actuator connected to the electrically conductive moveable contact, the actuator associated with a first stable position in which the electrically conductive contact is electrically connected to a stationary contact and a second stable position in which the electrically conductive contact is disconnected from the stationary contact; and an elastic assembly coupled to the actuator. The elastic assembly is configured to allow the actuator to move between the first stable position and the second stable position and to hold the actuator in the first position or the second position.

Implementations may include one or more of the following features.

The elastic assembly may be further configured to apply force along a direction of movement of the actuator to thereby urge the actuator into the first position or the second position. The elastic assembly may have an expanded state and a compressed state, the elastic assembly, may be in the expanded state when the actuator is in the first position and when the actuator is in the second position, and the elastic assembly may be in the compressed state when the actuator is at a midpoint between the first position and the second position.

Implementations of any of the techniques described herein may be a system, an electrical apparatus that includes a switch, a switch for an electrical apparatus, a method or a switch. The details of one or more implementations are set forth in the accompanying drawings and the description below. Other features will be apparent from the description and drawings, and from the claims.

DRAWING DESCRIPTION

DETAILED DESCRIPTION

Figure 1:
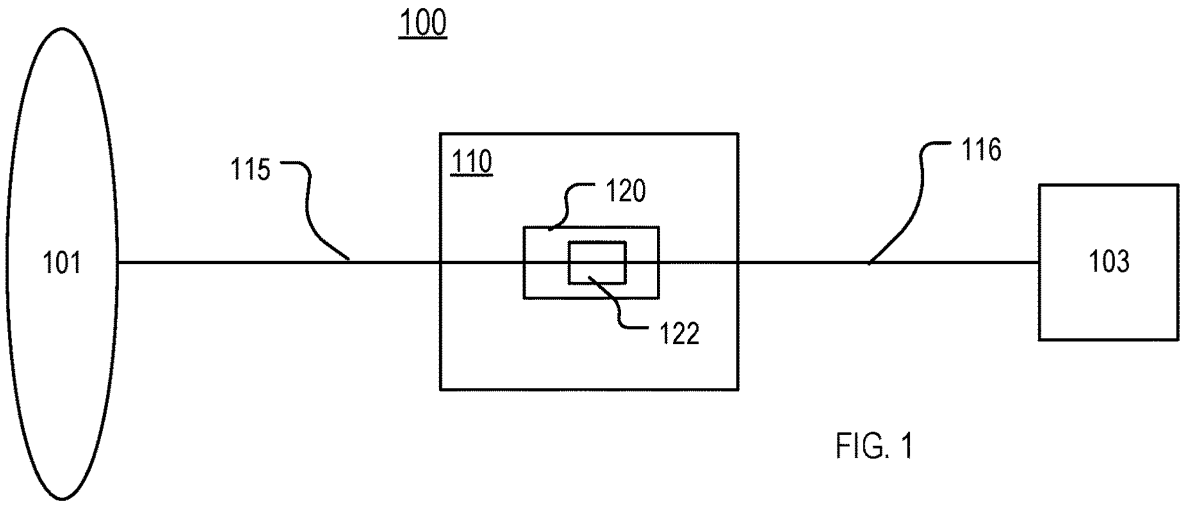
FIG. 1 is a block diagram of system that includes an example of an electrical apparatus.

FIG. 1 is a block diagram of system 100 that includes an electrical apparatus 110. The electrical apparatus 110 includes a switch 120 that is electrically connected to a first power line 115 and a second power line 116. The first power line 115 connects the electrical apparatus 110 to an alternating current (AC) power grid 101. The second power line 116 connects the electrical apparatus 110 to a load 103. The switch 120 is configured to repeatedly transition between an opened state and a closed state. When the switch 120 is open, the first power line 115 and the second power line 116 are not connected and the load 103 is disconnected from the AC power grid 101. When the switch 120 is closed, the first power line 115 and the second power line 116 are connected and the load 103 is electrically connected to the AC power grid 101.

As discussed in greater detail below, the switch 120 includes an elastic assembly 122 (or a snap fit contact mechanism 122) that encourages the switch 120 to remain in the open state or the closed state, transitions the switch between the open and closed states quickly when the switch 120 is intentionally transitioned between states, and includes fewer components than legacy switching mechanisms. Before discussing the switch 120 in more detail, an overview of the system 100 is provided.

The electrical apparatus 110 may be any type of device that can be used in the AC power grid 101. The electrical apparatus 110 may be an electrically operated oil switch for switching capacitive and/or inductive currents, a capacitor switch, a transformer, or a regulator, just to name a few. A single phase is shown in FIG. 1, but the electrical apparatus 110 may be a multi-phase device. For example, the electrical apparatus 110 may be a three-phase device. The first and second power lines 115, 116 may be any type of medium that is capable of conducting electricity. For example the power lines 115, 116 may be transmission lines, distribution lines, wires, and/or electrical cables, just to name a few.

The AC power grid 101 is a three-phase power grid that operates at a fundamental frequency of, for example, 50 or 60 Hertz (Hz). The power grid 101 includes devices, systems, and components that transfer, distribute, generate, and/or absorb electricity. For example, the AC power grid 101 may include, without limitation, generators, power plants, electrical substations, transformers, renewable energy sources, transmission lines, reclosers and switchgear, fuses, surge arrestors, combinations of such devices, and any other device used to transfer or distribute electricity. The electrical apparatus 110 may be connected to any device in the power grid 101.

The AC power grid 101 may be low-voltage (for example, up to 1 kilovolt (kV)), medium-voltage or distribution voltage (for example, between 1 kilovolts (kV) and 35 kV), or high-voltage (for example, 35 kV and greater). The power grid 101 may include more than one sub-grid or portion. For example, the power grid 101 may include AC micro-grids, AC area networks, or AC spot networks that serve particular customers. These sub-grids may be connected to each other via switches and/or other devices to form the grid 101. Moreover, sub-grids within the grid 101 may have different nominal voltages. For example, the grid 101 may include a medium-voltage portion connected to a low-voltage portion through a distribution transformer. All or part of the power grid 101 may be underground.

The load 103 may be any device that uses, transfers, or distributes electricity in a residential, industrial, or commercial setting, and the load 103 may include more than one device. For example, the load 103 may be a motor, an uninterruptable power supply, a capacitor, a power-factor correction device (such as a capacitor bank), or a lighting system. The load 103 may be a device that connects the electrical apparatus 110 to another portion of the power grid 101. For example, the load 103 may be a recloser or switchgear, a transformer, or a point of common coupling (PCC) that provides an AC bus for more than one discrete load. The load 103 may include one or more distributed energy resources (DER). A DER is an electricity-producing resource and/or a controllable load. Examples of DER include, for example, solar-based energy sources such as, for example, solar panels and solar arrays; wind-based energy sources, such as, for example wind turbines and windmills; combined heat and power plants; rechargeable sources (such as batteries); natural gas-fueled generators; electric vehicles; and controllable loads, such as, for example, some heating, ventilation, air conditioning (HVAC) systems and electric water heaters.

Figure 2:
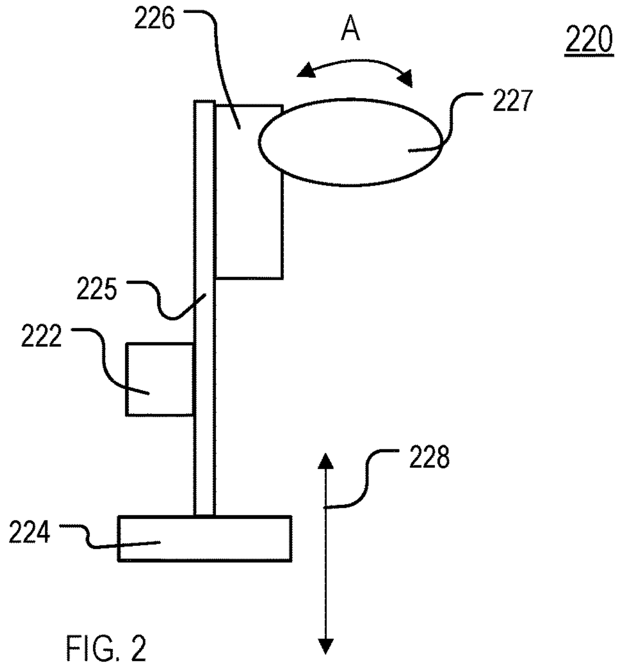
FIG. 2 is a block diagram of an example of a switch.

FIG. 2 is a block diagram of a switch 220, which is an example of the switch 120. The switch 220 includes a moveable contact 224 coupled to an actuator 225. In this example, the actuator 225 is a rod, and the moveable contact 224 is at an end of the rod. The moveable contact 224 is made of any type of electrically conductive material. For example, the moveable contact 224 may be made of a metal or a metal alloy. Examples of such materials include, without limitation, brass, copper, steel, and aluminum. The moveable contact 224 may include a combination of electrical conductive materials. In some implementations, the moveable contact 224 includes a substrate of a non-metallic material that is coated with a metallic material such as brass or copper. The actuator 225 is made of an electrically insulating material, such as, for example, an electrically insulating polymer or a ceramic. The actuator 225 may be made of a combination of insulating materials.

The actuator 225 includes a cam region 226, which is configured to interact with a cam 227. Rotation of the cam

227 along the arc A causes the actuator 225 (and the moveable contact 224, which is connected to the actuator 225) to move along an axis 228. The switch 220 also includes an elastic assembly 222 that is attached to the actuator 225. The elastic assembly 222 is any device or combination of devices that is capable of holding the actuator 225 in two stable positions while also allowing the actuator 225 to move between the two stable positions. The elastic assembly 222 may include any component that expands and contracts. For example, the elastic assembly 222 may be one or more coil springs, one or more diaphragms, one or more leaf springs, and/or one or more tension compression springs, just to name a few. In operational use, the switch 220 is positioned such that the moveable electrical contact 224 makes contact with an electrical contact in the electrical apparatus 110 when the actuator 225 is in a first stable position and is electrically disconnected from the electrical contact in the electrical apparatus 110 when the actuator 225 is in the second stable position.

The switch 220 may be rated to switch AC currents having a peak magnitude between, for example, 60 and 200 Amperes (A), up to 200 A, between 150 A and 300 A, or between 200 A and 400 A. These current values are provided as examples, and the switch 220 may be configured for use in applications in which larger or smaller AC currents flow in the switch 220. The elastic assembly 222 provides a force that is sufficient to maintain the switch 220 in one of the two stable positions at currents that meet or exceed the rated current of the switch. For example, the elastic assembly 222 may provide a force between about 0.2 Newtons (N) and 60 N on the moveable contact 224 in the first stable position, depending on the currents expected for the application. Moreover, the elastic assembly 222 may provide force that is sufficient to maintain the switch 220 in the first stable position (with the moveable contact 224 in contact with the electrical contact in the apparatus 110) when the current is 150% or 200% of the rated current of the switch 220. For applications in which the switch 220 is rated at 200 A, the elastic apparatus 222 may be configured to apply a force of about 60 N so that the moveable electrical contact 224 remains in the first stable position even if the switch 220 conducts large currents (for example, 300 A peak).

Figure 3A:
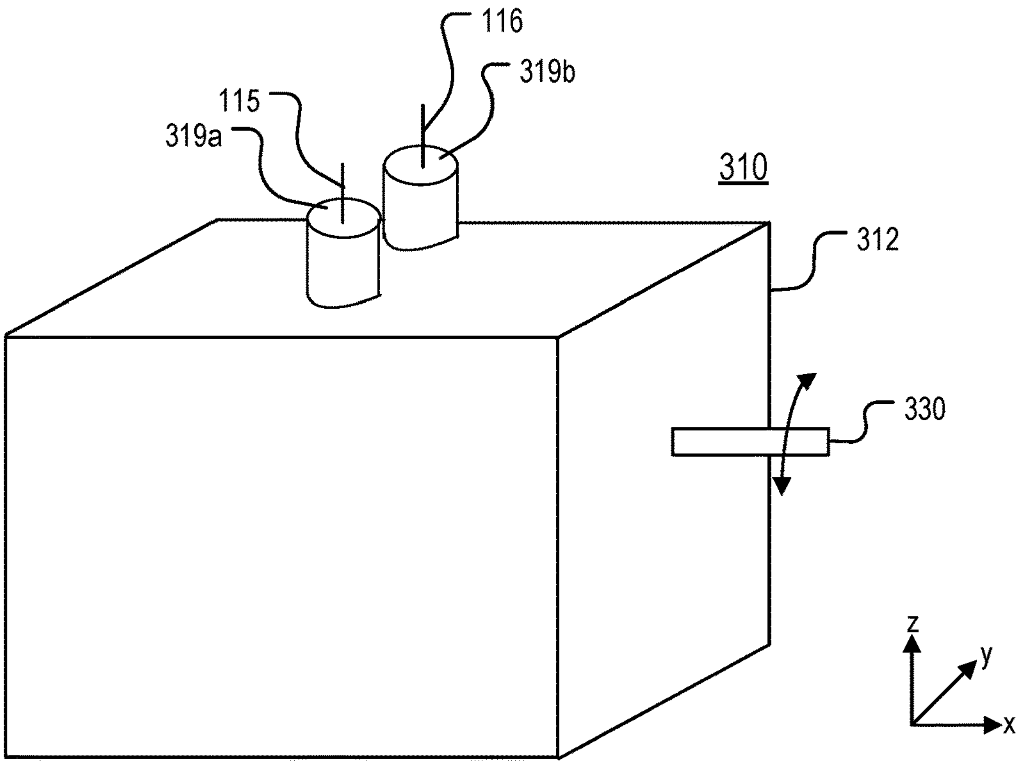
FIG. 3A is a perspective exterior view of an example of an electrical apparatus.
Figure 3B:
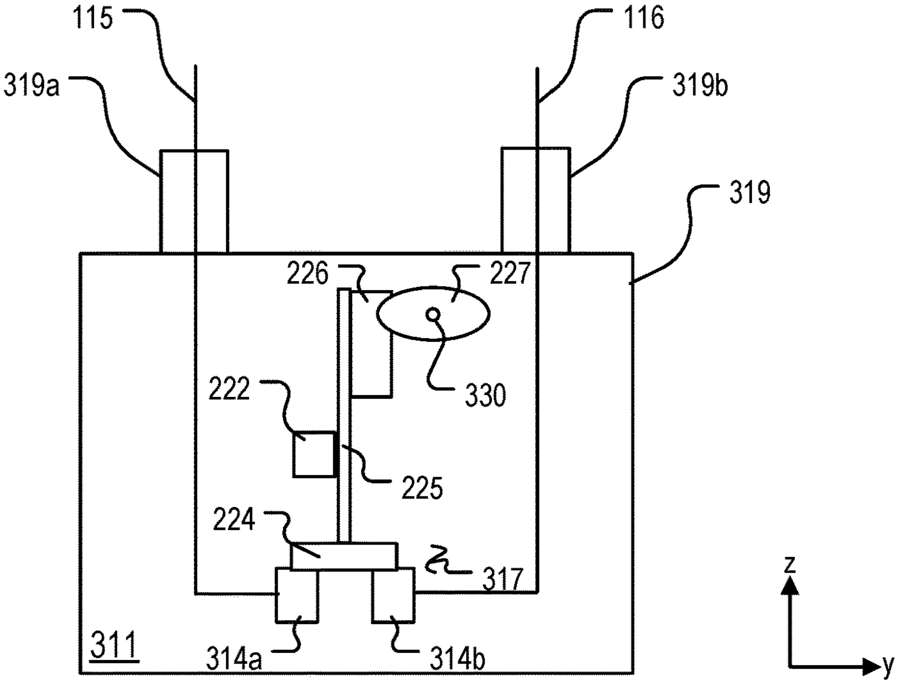
FIG. 3B is a side cross-sectional view of the electrical apparatus of FIG. 3A.

FIGS. 3A and 3B provide an example of the switch 220 installed in an electrical apparatus 310. FIG. 3A is a perspective exterior view of the electrical apparatus 310. FIG. 3B is a side cross-sectional view of the electrical apparatus 310 in the Y-Z plane. The electrical apparatus 310 may be, for example, a capacitor switch. The electrical apparatus 310 includes a housing or tank 312 that defines the interior region 311. The switch 220 is in the interior region 311. The housing 312 is made of a rugged material that protects the switch 220 and other items in the interior region 311. For example, the housing 312 may be stainless steel, aluminum, or a ruggedized polymer material. The housing 312 may be sealed such that the interior region 311 is impervious to fluid ingress. The interior region 311 may include an electrically insulating fluid, for example, oil or a synthetic dielectric fluid.

The electrical apparatus 310 also includes stationary contacts 314*a* and 314*b*. The stationary contacts 314*a* and 314*b* are discrete contacts that are not electrically connected to each other. The stationary contacts 314*a* and 314*b* are mounted to an interior structure 317. The interior structure 317 may be, for example, an interior wall of the housing 312 or a shelf in the interior region 311. The stationary contacts 314*a* and 314*b* are fixed to the structure 317 such that the stationary contacts 314*a* and 314*b* do not move. For example, the stationary contacts 314*a* and 314*b* may be bolted to the structure 317, attached to the structure 317 with an adhesive, and/or welded or brazed to the structure 317. The stationary contacts 314*a* and 314*b* are made with an electrically conductive material. For example, the stationary contacts 314*a* and 314*b* may be metal, a metal alloy, or a substrate coated with a metallic material. The stationary contacts 314*a* and 314*b* are electrically isolated from the housing 312 and other components in the interior region 311

The stationary contact 314*a* is electrically connected to the first power line 115, and the stationary contact 314*b* is electrically connected to the second power line 116. The electrical apparatus 310 also includes bushings 319*a* and 319*b*. The bushings 319*a* and 319*b* extend from an exterior of the housing 312 and are made of an electrically insulating material such as, for example, ceramic or a polymer. The first power line 115 passes through the bushing 319*a*, and the second power line 116 passes through the bushing 319*b*.

The electrical apparatus 310 also includes an operating interface 330. The operating interface 330 is accessible from outside of the housing 312, and the operating interface 330 is coupled to the cam 227. The operating interface 330 may be, for example, a handle, rod, or a button that is configured to be operated by a human operator. The operating interface 330 may be configured to be operated directly by the human operator, for example, by the operating grasping or otherwise manually manipulating the operating interface 330. Additionally or alternatively, the operating interface 330 may be configured for remote operation, electronic operation, motor operation, and/or configured for indirect operation by an operator, for example, by an operator who manipulates the operating interface 330 with a hot stick. Manipulation of the operating interface 330 causes the cam 227 to rotate in the Y-Z plane and to interact with the cam region 226, thereby moving the actuator 225 in the +Z direction or —Z direction.

In the example of FIGS. 3A and 3B, the operating interface is a rod that extends along the X axis through the housing 312 and is attached to the center of the cam 227. The rod extends out of the page in FIG. 3B. Rotation of the rod in the clockwise direction in the Y-Z plane causes the cam 227 to rotate in the clockwise direction in the Y-Z plane. Rotating the cam 227 in the Y-Z plane causes the actuator 225 to move linearly along the Z axis. In other words, the cam 227 translates the rotation of the operating interface 330 into linear motion of the actuator 225. Thus, by rotating the operating interface 330, the moveable contact 224 moves along the Z direction and can be joined to the stationary contacts 314*a*, 314*b* to close the switch 220 and separated from the stationary contacts 314*a*, 314*b* to open the switch 220.

When the switch 220 is closed, electrical current flows in a current path formed by the first power line 115, the stationary contact 314*a*, the moveable contact 224, the stationary contact 315*b*, and the second power line 116. When the switch 220 is open, the moveable contact 224 is separated from the stationary contacts 314*a* and 314*b* such that current cannot flow in the current path. In the example of FIG. 3B, the switch 220 is closed, and rotating the cam 227 in the clockwise direction (looking into the page in FIG. 3B) causes the actuator 225 and the moveable contact 224 to move in the Z direction and separate from the stationary contacts 314*a* and 314*b*. Rotating the cam 227 in the counterclockwise direction (looking into the page in FIG. 3B) causes the actuator 225 and the moveable contact 224 to move in the —Z direction to reconnect the moveable contact 224 to the stationary contacts 314*a* and 314*b*.

Figure 4A:
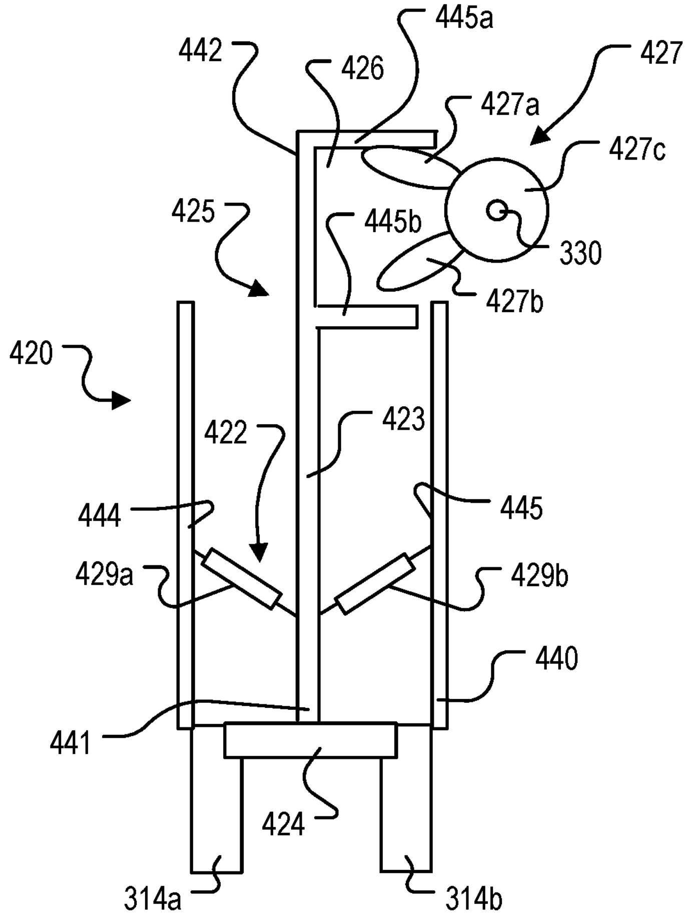
FIG. 4A shows an example of a switch in a closed state.
Figure 4B:
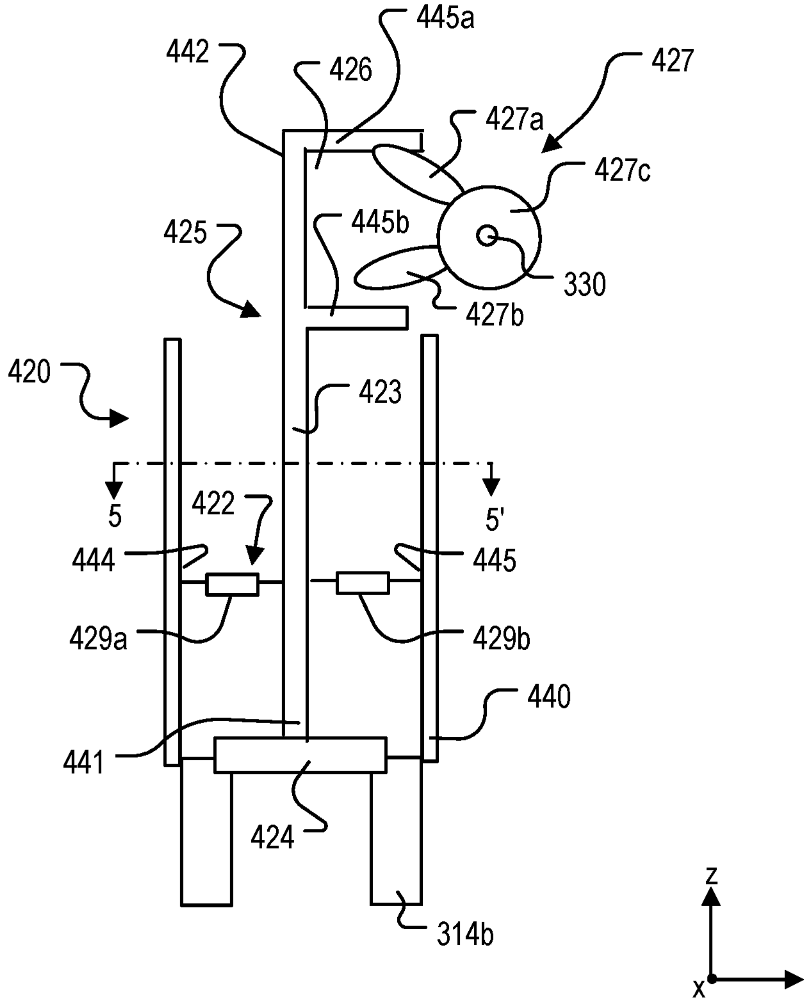
FIG. 4B shows the switch of FIG. 4A during a transition period.
Figure 4C:
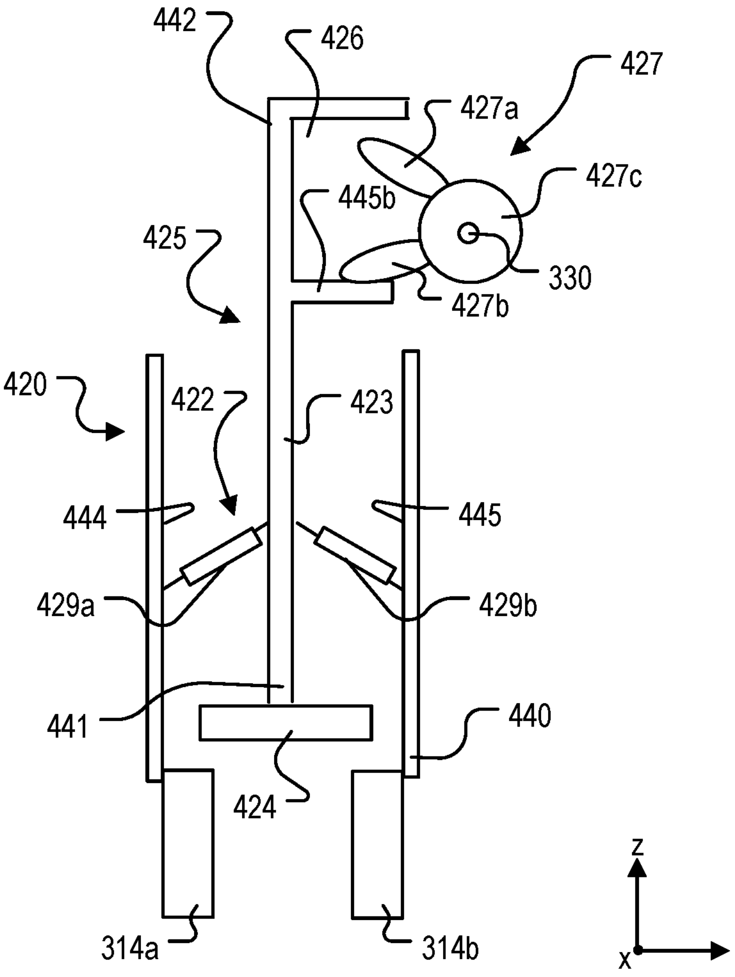
FIG. 4C shows the switch of FIG. 4A in an opened state.
Figure 5A:
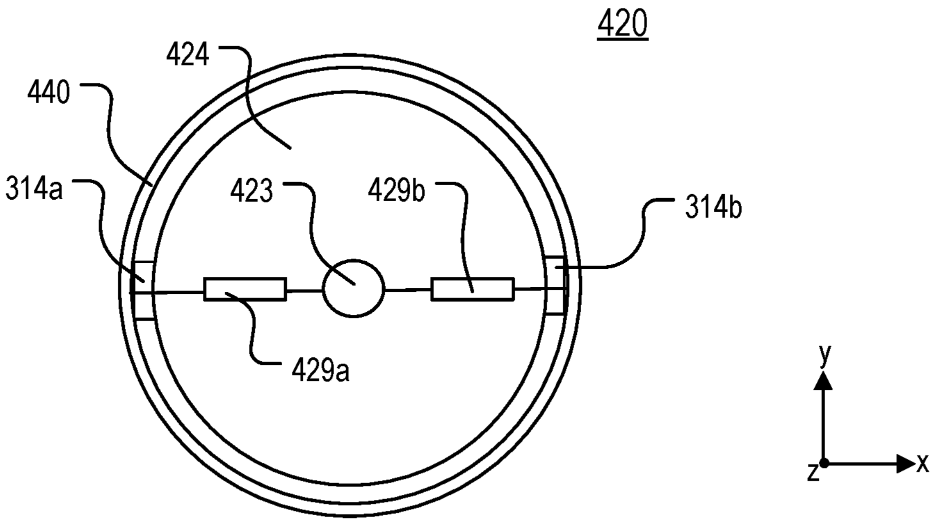
FIG. 5A is a cross-section of the switch of FIG. 4A taken along the line 5-5' of FIG. 4B.

FIGS. 4A-4C are block diagrams of a switch 420 in the Y-Z plane. The coordinate system of FIGS. 4A-4C is the same as the coordinate system of FIGS. 3A and 3B. The switch 420 may be used with an electrical apparatus such as the electrical apparatus 110 (FIG. 1) or the electrical apparatus 310 (FIGS. 3A and 3B). The example of FIGS. 4A-4C is discussed with respect to the electrical apparatus 310, with the switch 420 positioned in the interior region 311 of the electrical apparatus 310. FIG. 4A shows the switch 420 in a closed state. FIG. 4B shows the switch 420 during a transition period as the switch 420 transitions from the closed state to an opened state. FIG. 4C shows the switch 420 in the opened state. FIG. 5A is a cross-section of the switch 420 in the X-Y plane taken along the line 5-5' of FIG. 4B.

The switch 420 includes an actuator 425 and a moveable contact 424. The actuator 425 has a rod-shaped base 423 that extends in the Z direction from an end 441 to an end 442. The actuator 425 is electrically insulating and may be made of, for example, a non-conductive polymer or ceramic material. The moveable contact 424 is attached to the end 441. The moveable contact 424 is electrically conductive. For example, the moveable contact 424 may be made of and/or coated with a metal or a metal alloy. The moveable contact 424 extends in the X-Y plane such that the moveable contact 424 touches the stationary contact **314*a* and the stationary contact 314*b* when the switch 420 is closed. For example, the moveable contact 424** may be a disk that has a circular cross-section in the X-Y plane.

The actuator 425 also includes a cam region 426. The cam region 426 is sized and shaped to interact with a cam 427. In the example shown in FIGS. 4A-4C, the cam region 426 is a U-shaped region or slot region formed by a part of the base 423 and first and second shelf members **445*a* and 445*b*. The first and second shelf members 445*a* and 445*b* extend from the base 423 in the Y direction. The first shelf member 445*a* is at the end 442, and the second shelf member 445*b* is between the first shelf member 445*a* and the end 441. The first and second shelf members 445*a* and 445*b* may extend in the X-Y plane. The space between the first and second shelf members 445*a* and 445*b* is open to receive the cam 427**.

Other configurations of the cam region 426 are possible. For example, the first shelf member **445*a* may be flush with the end 442 (as shown in the example of FIGS. 4A-4C), or the first shelf member 445*a* may be displaced from the end 442** in the —Z direction.

The switch 420 also includes a support 440. In the example of FIGS. 4A-4C, the support 440 is a cylinder that has a circular cross-section in the X-Y plane, and the support 440 is attached to the stationary contacts **314*a* and 314*b*. The support 440 is electrically insulating and is not electrically connected to the stationary contacts 314*a* and 314*b*. Other implementations are possible. For example, the support 440 may be attached to an interior wall of the housing 312. Moreover, the support 440 may be implemented as a shape other than a cylinder. For example, the support 440** may be made of separate wall structures that do not directly touch each other.

The switch 420 also includes an elastic assembly 422. The elastic assembly 422 includes a first elastic member **429*a* and a second elastic member 429*b*. The first elastic member 429*a* is attached to the base 423 and to a first side 444 of the support 440. The second elastic member 429*b* is attached to the base 423 and to a second side 445 of the support 440. The second side 445 is opposite the first side 444**.

The first and second elastic members **429*a* and 429*b* may be any type of structure that is capable of expanding and contracting. For example, the first and second elastic members 429*a* and 429*b* may be coil springs. Two elastic members are shown in the example of FIGS. 4A-4C, but more or fewer elastic members may be used. For example, FIG. 5B** shows an implementation in which four elastic members are used.

The cam 427 includes a base **427*c* and lobes 427*a* and 427*b* that extend from the base 427*c*. The base 427*c* is a disk and has a circular cross-section in the Y-Z plane. The base 427*c* is mounted on the operating interface 330 (which extends into the page in FIGS. 4A-4C). The lobes 427*a* and 427*b* are connected to the base 427*c* such that, when the operating interface 330 rotates, the base 427*c* and the lobes 427*a* and 427*b* rotate in the same direction as interface 330. Other implementations of the cam 427 are possible. For example, the cam 427 may have an elliptical cross-section in the Y-Z plane and may be implemented without the lobes 427*a* and 427*b*. Moreover, the lobes 427*a* and 427*b* are positioned and configured for interaction with the cam region 426 and may be oriented along directions other than what is shown in FIGS. 4A-4C** for cam regions that have other geometries.

When the switch 420 is closed (FIG. 4A), the moveable contact 424 is physically connected to the stationary contacts **314*a* and 314*b*. The first and second elastic members 429*a* and 429*b* are in the expanded state and exert a force in the —Z direction, thus restricting the ability of the moveable contact 424 to move in the Z direction. In this way, the first and second elastic member 429*a* and 429*b* help maintain the connection between the moveable contact 424 and the stationary contacts 314*a*, 314*b* until the switch 420 is intentionally opened. The position of the actuator 425 and the moveable contact 424 achieved with the expanded first and second elastic members 429*a* and 429*b* (shown in FIG. 4A) is a stable position of the actuator. By improving the connection between the moveable contact 424 and the stationary contacts 314*a*, 314*b*, the elastic assembly 422 enhances the safety and performance of the switch 420** with an efficient design that uses relatively few parts.

Referring to FIG. 4B, to open the switch 420, the operating interface 330 is rotated in the clockwise direction (looking into the page). Rotating the operating interface 330 in the clockwise direction causes the cam 427 to also rotate in the clockwise direction and the lobe **427*a* contacts the first shelf member 445*a*. The rotating lobe 427*a* applies a force in the Z direction to the underside of the first shelf member 445*a*. This force drives the actuator 425 in the Z direction and compresses the elastic members 429*a* and 429*b*. When the elastic members 429*a* and 429*b* are compressed (as shown in FIG. 4B), they extend generally in a line along the Y direction and the actuator 425 is at the mid-point of its range of motion. The actuator 425 moves through the mid-point and does not remain in the position shown in FIG. 4B. The position of the actuator 425 shown in FIG. 4B** is generally not a stable position of the actuator.

Referring to FIG. 4C, the actuator 425 continues to move in the Z direction and the elastic members **429*a* and 429*b* snap from the compressed state and expand toward the end 442. The expanded elastic members 429*a* and 429*b* apply a force in the Z direction and cause the moveable contact 424 to quickly separate from the stationary contacts 314*a* and 314*b*. The lobe 427*b* rests on the upper side of the second shelf member 445*b*, and the force in the Z direction from the expanded elastic member 429*a* and 429*b* helps to maintain the switch 420 in the open position. The position of the actuator 425 and the moveable contact 424 achieved with the expanded first and second elastic members 429***a* and 429*b* (shown in FIG. 4C) is a second stable position of the actuator.

To close the switch 420, the operating interface 330 is rotated in the counterclockwise direction and the lobe 427*b* presses the second shelf member 445*b* in the —Z direction. The actuator 425 moves in the —Z direction and the elastic members 429*a* and 429*b* are compressed as shown in FIG. 4B. The actuator 425 continues to move in the —Z direction, and the elastic members 429*a* and 429*b* snap through to the expanded state to connect the moveable contact 424 to the stationary contacts 314*a* and 314*b*, as shown in FIG. 4A.

Figure 5B:
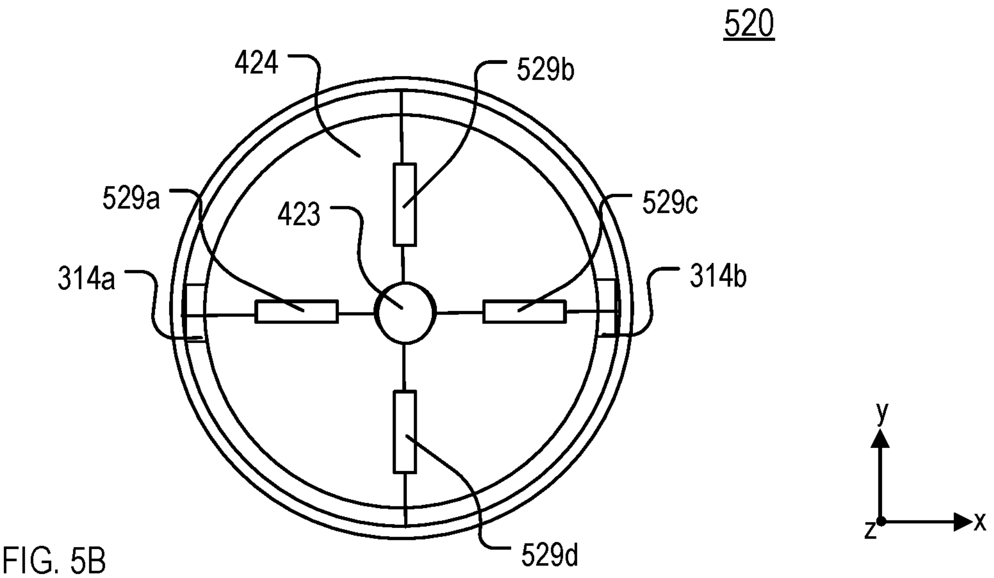
FIG. 5B is a cross-section of another example of a switch.

FIG. 5A is a cross-sectional view of the switch 420 taken along the line 5-5' of FIG. 4B. In the view shown in FIG. 5A, the elastic members 429*a* and 429*b* are in the compressed state. FIG. 5B is a cross-sectional view of a switch 520 in the X-Y plane. The switch 520 is the same as the switch 420, except the switch 520 includes four elastic members 529*a*, 529*b*, 529*c*, 529*d* that are attached to the actuator 425 and the support 440. When the four elastic members 529*a*, 529*b*, 529*c*, 529*d* are in the compressed state (as shown in FIG. 5B), the elastic members 529*a*, 529*b*, 529*c*, 529*d* extend radially outward from the base portion 423 actuator 425, with the members 529*a* and 529*c* extending along the X direction and the members 529*b* and 529*d* extending along the Y direction.

Other implementations are within the scope of the claims. For example, the electrical apparatus 310 includes the two stationary contacts 314*a* and 314*b*. However, the switch 120, 220, 420, and 520 may be used in an electrical apparatus that includes one stationary contact or in an electrical apparatus that includes more than two stationary contacts.

What is claimed is:

1. An electrical apparatus comprising:
- a support;
- a first electrically conductive contact mounted to the support; and
- a switch comprising:
  - an electrically conductive moveable contact;
  - a cam;
  - an actuator connected to the electrically conductive moveable contact, the actuator comprising a cam region configured to interact with the cam, wherein rotation of the cam moves the actuator along a linear path between one of two stable positions, the two stable positions comprising a first position and a second position; and
  - an elastic assembly connected to the actuator and the support, the elastic assembly configured to hold the actuator in either of the two stable positions,
- wherein, when the actuator is in the first position, the switch is closed and the electrically conductive moveable contact is connected to the first electrically conductive contact; and, when the actuator is in the second position, the switch is open and the electrically conductive moveable contact is separated from the first electrically conductive contact.

2. The electrical apparatus of claim 1, wherein the elastic assembly is in a relaxed state when the actuator is in the first position and is in the relaxed state when the actuator is in the second position.

3. The electrical apparatus of claim 1, wherein the elastic assembly comprises one or more springs.

4. The electrical apparatus of claim 1, wherein the actuator comprises a rod that extends from a first end to a second end, the first end of the rod is connected to the electrically conductive moveable contact, and the cam region comprises a slot that extends from the rod.

5. The electrical apparatus of claim 4, wherein the slot comprises a first side and a second side.

6. The electrical apparatus of claim 5, wherein the cam comprises a first lobe and a second lobe, and, the first lobe pushes on the first side of the slot to separate the moveable electrically conductive contact and the first electrically conductive contact; and the second lobe pushes on the second side of the slot to connect the moveable electrically conductive contact and the first electrically conductive contact.

7. The electrical apparatus of claim 5, wherein the cam is oblong, and, a first portion of the cam pushes on the first side of the slot to separate the moveable electrically conductive contact and the first electrically conductive contact; and a second portion of the cam pushes on the second side of the slot to connect the moveable electrically conductive contact and the first electrically conductive contact.

8. The electrical apparatus of claim 1, wherein the elastic assembly has an expanded state and a compressed state, and the elastic assembly is in the expanded state when the actuator is in the first position and when the actuator is in the second position.

9. The electrical apparatus of claim 1, wherein the elastic assembly has an expanded state and a compressed state, and the elastic assembly is in the compressed state when the actuator is at a midpoint between the first position and the second position.

10. The electrical apparatus of claim 9, wherein the elastic assembly is in the expanded state when the actuator is in the first position and when the actuator is in the second position.

11. A switch comprising:
- an electrically conductive moveable contact;
- a cam;
- an actuator connected to the electrically conductive moveable contact, the actuator comprising a cam region configured to interact with the cam, wherein the cam is configured to apply a force to the actuator along an axis, and the actuator is configured to move along the axis between a first stable position and a second stable position in response to the force; and
- an elastic assembly attached to the actuator at a connection point, the elastic assembly configured to hold the actuator in either the first stable position or the second stable position and to remain attached to the actuator at the connection point while the actuator moves between the first stable position and the second stable position, wherein, when the actuator is in the first stable position, the switch is closed and the electrically conductive moveable contact is connected to a first electrically conductive contact; and, when the actuator is in the second stable position, the switch is open and the electrically conductive moveable contact is separated from the first electrically conductive contact.

12. The switch of claim 11, wherein the elastic assembly is in a relaxed state when the actuator is in the first stable position and is in the relaxed state when the actuator is in the second stable position.

13. The switch of claim 11, wherein the elastic assembly comprises one or more springs.

14. A switch for an electrical apparatus, the switch comprising:
- an electrically conductive moveable contact;
- an actuator comprising a first end and a second end, the second end of the actuator connected to the electrically conductive moveable contact, the actuator associated with a first stable position in which the electrically conductive moveable contact is electrically connected to a stationary contact and a second stable position in which the electrically conductive moveable contact is disconnected from the stationary contact;

an elastic assembly coupled to a portion of the actuator between the first end and the second end, wherein the elastic assembly is configured to allow the actuator to move along a linear path between the first stable position and the second stable position and to hold the actuator in the first stable position or the second stable position;

a support; and an electrically conductive stationary contact mounted to the support, wherein the elastic assembly is connected to the actuator and the support.

15. The switch of claim 14, further comprising: a tank that defines an interior region, and wherein the electrically conductive stationary contact are in the interior region.

16. The switch of claim 14, wherein the elastic assembly is further configured to apply force along a direction of movement of the actuator to thereby urge the actuator into the first stable position or the second stable position.

17. The switch of claim 16, wherein the elastic assembly has an expanded state and a compressed state, the elastic assembly is in the expanded state when the actuator is in the first stable position and when the actuator is in the second stable position, and the elastic assembly is in the compressed state when the actuator is at a midpoint between the first stable position and the second stable position.

18. The switch of claim 14, further comprising the stationary contact, and wherein the support comprises an electrically insulating cylindrical body that is attached to the stationary contact.

19. An electrical apparatus comprising:

a first electrically conductive contact;

a support;

a switch comprising:

an electrically conductive moveable contact;

a cam;

an actuator connected to the electrically conductive moveable contact, the actuator comprising a cam region configured to interact with the cam, wherein rotation of the cam moves the actuator between one of two stable positions, the two stable positions comprising a first position and a second position; and an elastic assembly coupled to the actuator and the support, the elastic assembly configured to hold the actuator in either of the two stable positions; and a tank that defines an interior region, wherein the switch and the first electrically conductive contact are in the interior region; the first electrically conductive contact is mounted to the support; when the actuator is in the first position, the switch is closed and the electrically conductive moveable contact is connected to the first electrically conductive contact; and, when the actuator is in the second position, the switch is open and the electrically conductive moveable contact is separated from the first electrically conductive contact.

20. The electrical apparatus of claim 19, further comprising an operating interface coupled to the cam, wherein the operating interface is accessible from an exterior of the tank such that interacting with the operating interface causes the cam to rotate.

21. The electrical apparatus of claim 20, further comprising an insulating fluid; and wherein the first electrically conductive contact is a stationary contact that is electrically connected to a capacitive device in the interior region.

* * * * *